UNITED STATES PATENT OFFICE.

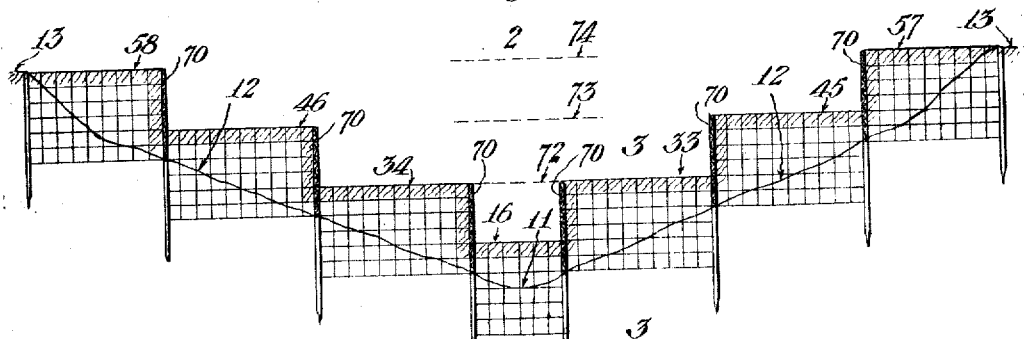
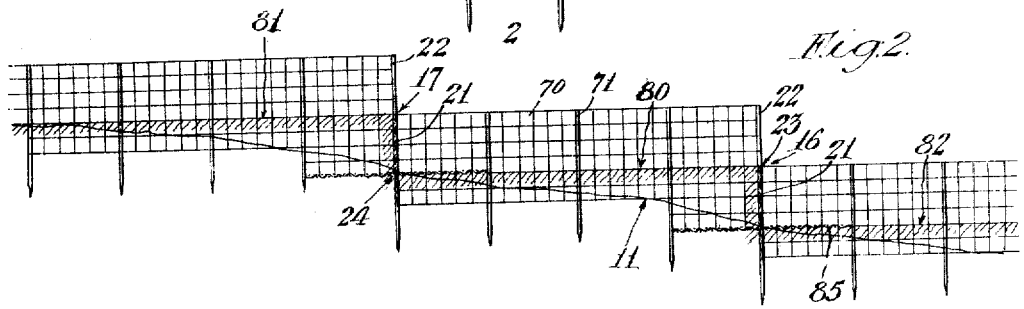
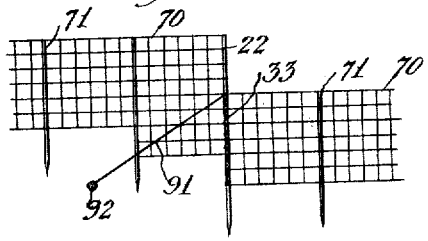
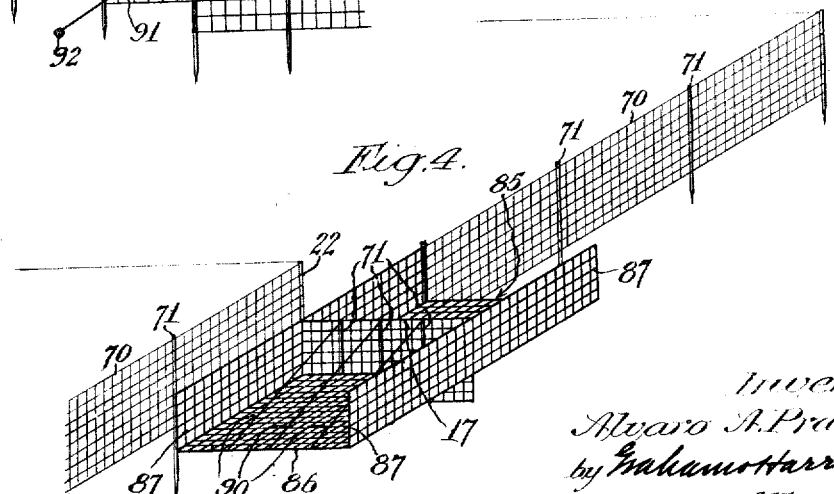

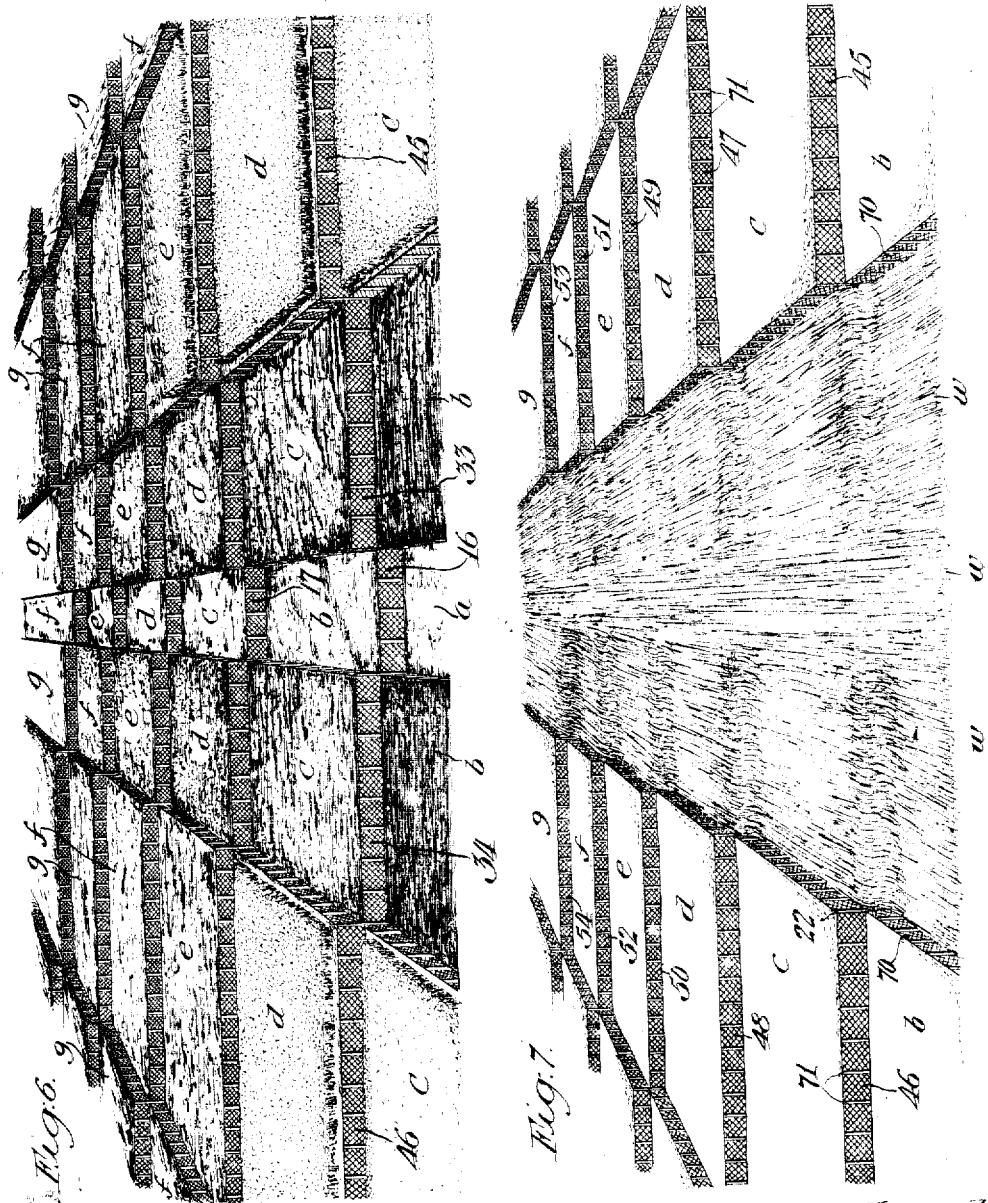

ALVARO A. PRATT, OF LOS ANGELES, CALIFORNIA.

FLOOD CONTROL.

1,268,770.

Specification of Letters Patent. Patented June 4, 1918.

Application filed May 7, 1917. Serial No. 167,122.

*To all whom it may concern:*

Be it known that I, ALVARO A. PRATT, a citizen of the United States, residing at Los Angeles, in the county of Los Angeles and State of California, have invented a new and useful Flood Control, of which the following is a specification.

My invention relates to flood control, and consists primarily in a system of check dams for controlling flood waters. It frequently happens that water courses at certain times are called upon to carry excessive amounts of water, due to heavy rain storms, and under such conditions the courses are frequently changed, new courses are formed, and the land at one or both sides of the water course washed away and valuable property destroyed.

The principal object of my invention is to provide a check dam system of simple form and construction by means of which flood waters may be controlled and caused to travel over a predetermined course.

Another object of my invention is to cause detrital or sedimentary deposits to build up the surface of the ground to predetermined levels, or to cause by erosion the creation of new channels with predetermined depth of channel floor, and elevations of confining banks.

Other objects and advantages will appear hereinafter.

Referring to the drawings, which are for illustrative purposes only:

Figure 1 is a diagrammatic cross sectional view of the natural bed of a stream, showing my check dam system arranged therein.

Fig. 2 is a longitudinal sectional view on line 2—2 Fig. 1.

Fig. 3 is a diagrammatic sectional view on the line 3—3 Fig. 1.

Fig. 4 is a perspective view of a portion of the device.

Fig. 5 is a diagrammatic plan view of the arrangement of the dams.

Fig. 6 is a perspective view of the completed system.

Fig. 7 is a perspective view of the dams shown in Fig. 6 under flood conditions.

In Fig. 1, 11 designates a line indicating the bed of a natural water course, 12 designates the sloping sides of the water course, and the lines 13 designate the ground level at the sides of the course.

In arranging the check dams, a point down-stream is arbitrarily selected where a master dam 15, as indicated in Fig. 5, is placed across the bed of a stream. Similar dams 16, 17, 18, 19 and 20 are placed across the bed of the stream at intervals up-stream from the dam 15, the top line of the dam 15 being level with, or slightly above, the bottom line of the dam 16, each lower dam being similarly arranged with relation to the next preceding dam up-stream. These dams are preferably made of wire mesh, as indicated at 21 in Fig. 2, secured to posts 22, the top 23 of the dam 16 being substantially level with the bottom 24 of the dam 17. The ground at each side of the bed of the water course is laid out in a series of substantially parallel courses 25, 26, 27, 28, 29 and 30 arranged at each side of the bed of the water course, each parallel course having provided therein a series of check dams, the lower-most check dams 31 and 32 of the courses 25 and 26 being so arranged that the bottoms of such dams are substantially level with the top of the dam 15 in the central water course, and each dam 33 to 42 inclusive in the courses 25 and 26 having the bottom thereof substantially level with the top of the adjacent dam in the central water course. The courses 27 and 28 respectively are also provided with a series of check dams 43 to 54 inclusive, as shown in Fig. 5, and the courses 29 and 30 are provided with check dams 55 to 66 inclusive, and in all the courses such dams are arranged as heretofore described with respect to the central course, that is, the top of each succeeding dam up-stream is level with the bottom, or slightly above the bottom, of the next dam up-stream therefrom in the same course, the different courses being separated by wire mesh, indicated at 70, which is secured to corner posts 22, there being one corner post at each end of each dam, and as many other posts 71 spaced between such end posts as may be necessary according to the distances between the respective dams and the width of the courses.

A cross section of the system when completed would appear as shown in Fig. 1, the check dam in the bed of the stream or central water course being indicated at 15, and the dotted line 72 indicating the height or the top of the next check dam up-stream, the bottom of such check dam being substantially level with the top of the check dam 16. The dotted line 73 indicates the height or top of the check dam 18, and the dotted line 74 indicates the top of the check dam 19. From an inspection of Fig. 1, it is evident that the top lines of the check dams 33 and 34 are level with the top line of the dam 17, indicated by the dotted line 72, and that the tops of the check dams 45 and 46 are level with the top line of the check dam 18, indicated by the dotted line 73, and that the top lines of the dams 57 and 58 are level with the top line of the check dam 19.

The action of the water flowing over the check dam system is as follows: Water flowing through the central course or the bed of the stream would carry debris against the check dam 20, and sand and other material would fill in back of the dam 20 until the bed of the stream would be level with the top of such dam 20, the water being discharged over the dam 20 where it would next come in contact with the dam 19, and successively thereafter with dams 18, 17, 16 and 15.

These check dams being arranged with respect to each other, as heretofore described, and filling in up to their levels, the surface of the stream would finally take the following form. The portion $a$ would be the lowest level of the stream, see Fig. 6, the portions marked $b$ would all be of the same level, the portions marked $c$ would all be of the same level, the portions marked $d$ would likewise all be of the same level, and the portions marked $e$, the portions marked $f$, and the portions marked $g$, would all be of the same level, so that the water flowing down-stream over the system would take the following course: If the amount of water flowing over the central course was sufficient to overflow, such overflow would flow over the parallel courses at each side of the central course, as shown in Fig. 7, the water being indicated at "$w$."

While I have indicated the natural bed of the central course of the stream at 11, as shown in Fig. 2, such bed of the stream when it is filled up, and the system completed, would be indicated by the line 80, indicating where the material has filled in behind the dam 16, the line 81 indicating the top of the material filled in behind the dam 17, and the line 82 indicating the top line of the material filled in behind the dam 15.

In some instances, it may be desirable to provide means for preventing the water as it flows over the check dam from digging out the bed of the stream directly thereunder, and in such cases I provide a wire extension 85 extending down-stream from the bottom of the check dam, and a similar extension or apron 86 extending up-stream from the bottom of the check dam, the apron 86 being connected by side extensions 87 to the wire at the sides of the course. The apron 86, together with the side extensions 87 and the dam, constitute a basket open at the top and at the up-stream end which may be filled with rocks and brush. The up-stream edge of the basket is preferably connected by guy wires 90 with the tops of the posts in the dam, and the tops of the dams in the other courses not having baskets may be connected by guy wires 91 with deadmen 92, as indicated in Fig. 3.

In Figs. 6 and 7 I have indicated the check dams as applied to large areas wherein the different sections, after being built up, may be placed under cultivation in such a manner that land which under ordinary circumstances is of no value, due to the contour and overflow, may be reclaimed and made of great value.

It is to be understood that my invention, in so far as the basket above referred to is concerned, is not limited to the exact location shown in the drawings, but the wire extension 85 and the extension 86 may be located lower than that shown in the drawings, in which case debris and other material would fill in above the basket to the final level of the stream. Neither do I limit the height of the basket as shown in the drawings, as the same may be made of various heights as requirements may make such changes necessary.

What I claim is:—

1. A flood control for water courses comprising a central course, a series of courses on each side of said central course, and a series of dams in each course, each dam in the respective courses having its top approximately level with the bottom of the next dam up-stream therefrom in the same course, and each dam in the respective courses having its bottom substantially level with the top of the adjacent dam in the next inner course.

2. A flood control for water courses comprising a central course, a series of courses on each side of said central course, a wire mesh separating the respective courses, and a series of wire mesh check dams in each course, each dam in the respective courses having its top approximately level with the bottom of the next dam up-stream therefrom in the same course.

3. A check dam comprising a wire structure consisting of a vertical portion, a horizontally extending up-stream portion, side extensions on said horizontal portion extending up-stream from the vertical portion, a horizontally extending down stream portion and side extensions on said horizontally extending down stream portion.

4. A wire mesh conduit open at each end and at the top consisting of a horizontal portion; a side portion extending upwardly at each side of the horizontal portion; and a wire mesh division wall extending between the side walls intermediate its length.

In testimony whereof, I have hereunto set my hand at Los Angeles, California, this 27th day of April, 1917.

ALVARO A. PRATT.